(12) United States Patent
Cuellar et al.

(10) Patent No.: US 8,635,709 B2
(45) Date of Patent: Jan. 21, 2014

(54) METHOD FOR OPERATING AN INSTALLATION USING DATA PROTECTED AGAINST UNAUTHORIZED USE

(75) Inventors: Jorge Cuellar, Baierbrunn (DE);
Hans-Georg Köpken, Erlangen (DE);
Matthias Lenord, Bubenreuth (DE);
Monika Maidl, München (DE)

(73) Assignee: Siemens Aktiengesellschaft, Munich (DE)

( * ) Notice: Subject to any disclaimer, the term of this patent is extended or adjusted under 35 U.S.C. 154(b) by 452 days.

(21) Appl. No.: 12/614,755

(22) Filed: Nov. 9, 2009

(65) Prior Publication Data
US 2010/0122352 A1   May 13, 2010

(30) Foreign Application Priority Data
Nov. 10, 2008   (EP) ..................................... 08019635

(51) Int. Cl.
*G06F 21/00* (2013.01)
(52) U.S. Cl.
USPC .................................... 726/30; 726/2; 726/27
(58) Field of Classification Search
USPC ............ 726/30–32, 4, 17, 25, 27; 705/51, 57, 705/59; 717/108, 116, 112
See application file for complete search history.

(56) References Cited

U.S. PATENT DOCUMENTS

| | | | |
|---|---|---|---|
| 2006/0155650 A1* | 7/2006 | Oh et al. | 705/57 |
| 2007/0126859 A1* | 6/2007 | Choi et al. | 348/14.02 |
| 2007/0219921 A1* | 9/2007 | Lee et al. | 705/59 |
| 2008/0127351 A1* | 5/2008 | Jang et al. | 726/26 |
| 2008/0172678 A1* | 7/2008 | Lee et al. | 719/315 |
| 2009/0265794 A1* | 10/2009 | Apelqvist | 726/30 |
| 2011/0179279 A1* | 7/2011 | Greevenbosch et al. | 713/176 |

FOREIGN PATENT DOCUMENTS

| | | |
|---|---|---|
| EP | 1 784 015 A2 | 5/2007 |
| EP | 1 947 587 A1 | 7/2008 |
| WO | WO 2006/129983 A1 | 12/2006 |
| WO | WO2007113163 | * 10/2007 |

OTHER PUBLICATIONS

Christian et al., "Machine translation of WO 2007/113163", Oct. 2007, pp. 1-7, http://translationportal.epo.org/emtp/translate/?ACTION=description-retrieval&COUNTRY=WO&ENGINE=google&FORMAT=docdb&KIND=A1&LOCALE=en_EP&NUMBER=2007113163&OPS=ops.epo.org&SRCLANG=de&TRGLANG=en.*

Christian et al., "Machine translation of WO 2007/113163", Oct. 2007, pp. 1-7, http://translationportal.epo.org/emtp/translate/?ACTION=description- retrieval&COU NTRY=W©& ENGIN E=google& FORMAT=docdb&KIN D=A1 &L©CALE=en_E P&N U M B E R=2007113163&©PS=ops.epo.orq&SRCLANG=de&TRGLANG=en.*

* cited by examiner

*Primary Examiner* — Kaveh Abrishamkar
*Assistant Examiner* — Carlos M De Jesus, Jr.

(57) ABSTRACT

A method and a device for operating a technical installation using data from a third party are provided, the data being protected against unauthorized use. A first and a second rights object are used for protecting the data, the first rights object specifying an authorized use of the data with a variable not defined in respect of its value and the second rights object defining a value for the variable.

17 Claims, 3 Drawing Sheets

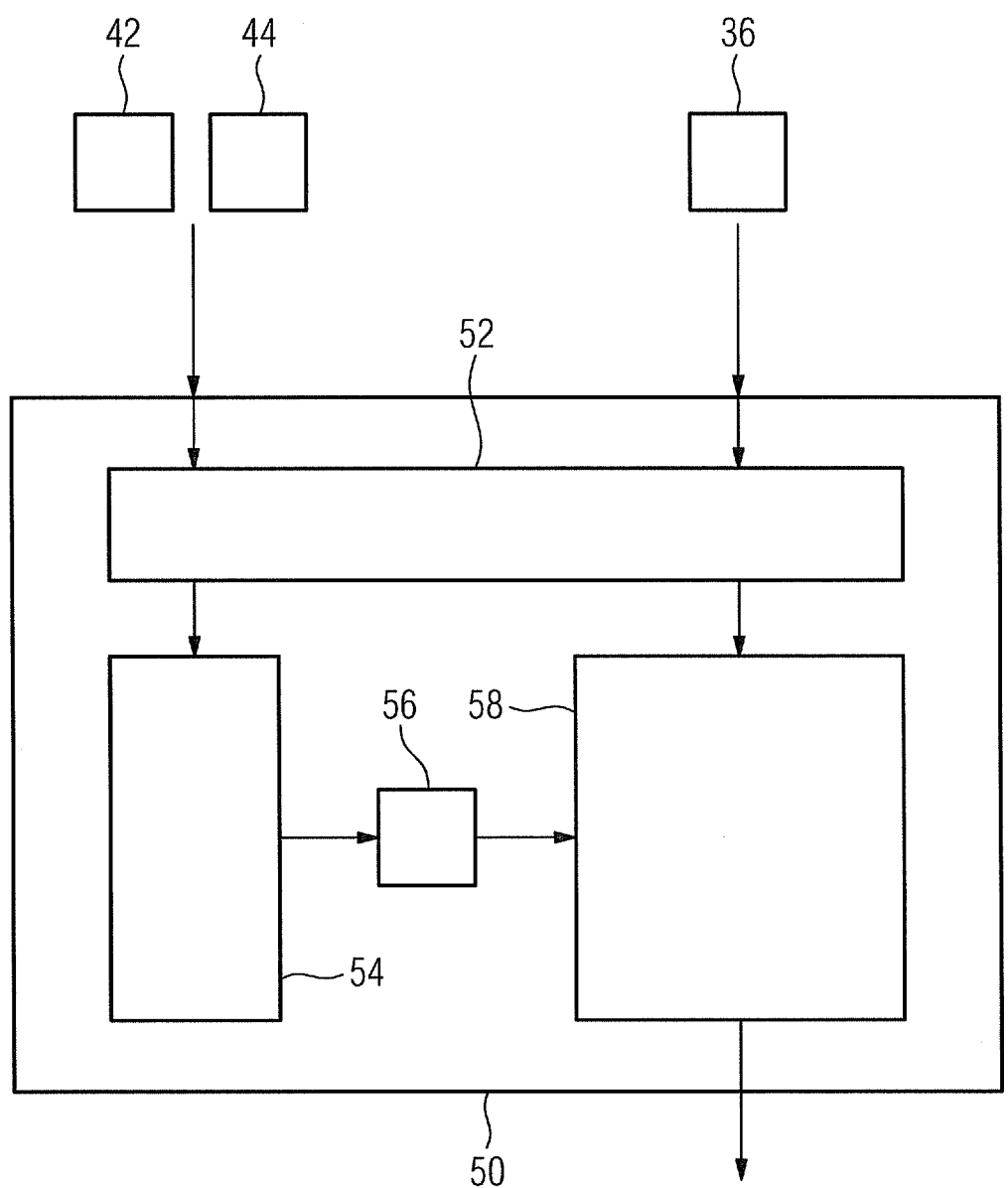

METHOD FOR OPERATING AN INSTALLATION USING DATA PROTECTED AGAINST UNAUTHORIZED USE

CROSS REFERENCE TO RELATED APPLICATIONS

This application claims priority of European Patent Office Application No. 08019635.5 EP filed Nov. 10, 2008, which is incorporated by reference herein in its entirety.

FIELD OF INVENTION

The invention relates to a method for operating a technical installation, e.g. a production plant, using data that is provided by a third party and that is or will be protected against unauthorized use. The data is protected against unauthorized use by means of what are known as rights objects. The invention also relates to a facility with means for carrying out the method, a corresponding computer program, a data medium with such a computer program and a computer system on which such a computer program is loaded.

BACKGROUND OF INVENTION

The invention addresses the problem of protecting intellectual property when its is forwarded to external service providers, e.g. a production enterprise that is commissioned by the owner of the rights (rights owner) in accordance with their specification, i.e. because of the respective intellectual property, to manufacture specific parts, objects, products etc. Other examples are simulations, tests and so forth carried out by external service providers. Previously only a contractual relationship has essentially existed between the rights owner and the service provider, and misuses of intellectual property indirectly or directly by the service provider must be penalized by way of claims for damages and the like.

SUMMARY OF INVENTION

The invention is based on the idea that intellectual property can be protected by so-called rights objects. This has become known for example in connection with copy-protection mechanisms applied to data media containing video or audio data, with said mechanisms representing an example of a rights object, in that they allow the respective data to be reproduced but prevent it being duplicated. The known ways of using rights objects are however not flexible enough for the areas of application outlined above, so that the invention attempts to provide help in this area.

Provided is a method for operating a technical installation, using data provided by a third party and that is or will be protected against unauthorized use, with rights objects being provided to protect the data that either include the data themselves are included for their part by the data or will be transferred independently of the data by the third party or through the latter with, for the use of actual data at least two rights objects, a first and a second rights object, being used, with the first rights object specifying an authorized use of the data with at least one variable not defined in respect of its value and with the second rights object defining a value for the at least one variable.

The use of a least two rights objects has the advantage that with the at least two rights objects a usual scenario for the contractual and business co-operation between the rights owner and a service provider or service providers can be emulated: If the rights owner concludes a framework contract with a service provider for example such that the service provider makes available basic production capacity, simulation capacity, test capacity etc and the systems, facilities etc. satisfy specific criteria, e.g. can carry out specific working steps (rolling, pressing, deep drawing etc), the working steps satisfy particular quality requirements predetermined by the rights owner etc., the rights owner will normally, e.g. in respect of the storage capacities and the like, not order a part quantity which are required for all objects to be marketed in line with optimistic expectations. Instead the rights owner will normally make purchases in a demand-oriented manner and will then receive parts from the service provider to the extent required for production of a batch, a production period etc.

Reduced to simple figures and simple timescales, it can be established that for a rights owner who has individual parts of a complex product manufactured by an external service provider and expects to be able to sell a quantity of 1200 of such a product every year, it is normally easier to request 100 items from the service provider each month instead of ordering a complete quantity of the 1200 individual parts at the start of the year and then taking care of storing them etc. themselves. Despite this, all successively requested parts should satisfy the same requirements, i.e. be produced on the basis of the same data and the same peripheral conditions, i.e. based on the intellectual property of the rights owner. Accordingly a one-time transfer is basically sufficient for such data. As soon as the service provider is in possession of the data which is protected by the first rights object, with the first rights object including at least one variable not defined in respect of its value, a value of the least one variable can be defined with each transfer of a second rights object. When translated to the scenario outlined above this can for example be the use of a variable which is designated by the clear text designation "production quantity" in the first rights object, for which in the second rights object a value of "100" is defined. Whenever the service provider receives a second rights object of this type for the first rights object initially received which relates overall to the individual part to be manufactured, production of a further quantity of 100 of the respective individual parts is possible and also permitted by the rights owner. The relationship between the first and the second or each second rights object is produced on the one hand from the reference to the variable used in the first rights object in each second rights object. A rights object in which a variable is allocated a value which is not stored in an assumed underlying first rights object cannot belong to this first rights object. This means that the relationship between first and the second or each second rights object can be made clear by a unique identification used for both rights objects. For this a character string encompassed by the first rights object comes into consideration which comprises characters which are suitable for encoding its membership of a group. Examples of this type of character string are "A123", "A124" etc., in which the character "A" can be taken as encoding that the item belongs to a group. Naturally other characters, other positions of the or of each significant character etc. are suitable. The character strings "123" and "124" in the example selected above can be used to encode a hierarchy or a dependency. The advantage of using such an identifier lies in the fact that by evaluating just the identifier it can be recognized rapidly and easily whether a newly received rights object belongs to other rights objects already received. If the identifier also includes components which encode a hierarchy, it can immediately be recognized which relationship a newly received rights object has to existing available rights objects, i.e. for example whether for a received rights object a rights object underlying said object in a hierarchy is present.

Expedient developments of the subject matter are presented in the dependent claims. References back to other claims in such case indicate the further embodiment of the subject matter of the main claim by the features of the respective dependent claim; they are not to be understood as dispensing with the aim of a self-contained protection of the subject matter for the combinations of features of the referred-back dependent claims. Furthermore, in respect of structuring the claims for a more detailed explanation of a feature in a subordinate claim, it is to be assumed that such a restriction is not present in the previous claims in each case.

As well as the example already outlined in which the variable encodes a number of products which may be manufactured using the data, and for which the value encompassed by the second rights object for the variable specifies the number of products in concrete terms, in addition and alternatively variables and associated values in a second rights object can be provided which relate to the period of usability of the data or to the scope of usability of the data. In accordance with a preferred embodiment there is correspondingly provision for the least one variable to encode a period during which the data is able to be used and for the value encompassed by the second rights object for the variable to actually specify the period of usability of the data e.g. in the form of a start and end date or in the faun of a period in hours, days, months etc.

Where the scope of the usability of the data is to be restricted on the service provider side, e.g. if the rights owner wishes to commission an engineering office as a service provider for a simulation of flow characteristics or similar of the individual part, the at least one variable of the first rights object can encode a level of detail down to which access to the data is to be possible, so that the value encompassed by the second rights object for the variable specifies the permitted level of detail in each case and the value of the variable can be selected so that all necessary data for the flow simulation, e.g. geometry surface contour, roughness etc. is accessible for the calculations to be carried out, but a graphic representation of particular details of the individual part and/or a printout of such details is impossible. A buzzword to be mentioned in this connection is shrink wrap model and a predetermined specification of a permitted level of detail by a rights owner can result in the service provider only being able to see the surface and not the internals of an object characterized by intellectual property or parts of such an object or otherwise being able to access such internals.

Preferably there is provision for a rights agent to the provided for the step of generating the or each derived rights object which, for the generation of derived rights objects, uses generation rules which are included in the received rights object. The rights agent is the central functionality of the method and the rights agent is that entity which performs the generation of derived rights objects centrally. When derived rights objects are generated by the rights agent on the basis of generation rules which are included in the received rights object, the rights owner, i.e. the sender of the original rights object, can influence generation of derived rights objects, e.g. restrict them, especially such that for example no more than a particular number of derived rights objects are generated, only derived rights objects for facilities of a specific type and/or service scope are generated etc. For the recipient of the original rights object the generation of derived rights objects by the rights agent has the advantage that those facilities to which the or each derived rights object is forwarded during the course of the method can be used for fulfilling the task related to the received rights object.

Preferably the step of forwarding the derived rights objects can be undertaken by means of the same rights agent. To this end the rights agent is a communication link to the facility or to each facility. The generation and forwarding of derived rights objects is thus practically "all-in one" and the use of one and the same functionality for both method steps has the advantage example that required data for generating and passing on derived rights objects in relation to the facilities available to the operator as contractor must only be provided once, at least must only be processed by one functionality, namely the rights agent.

There is also preferably provision for the rights agent to use forwarding rules for forwarding derived rights objects that are included in the received rights object or will be made available separately. While the above-mentioned creation rules essentially relate to conditions which are pre-specified by the rights owner, the forwarding rules are also at least in part based on conditions that are oriented to the type and number of facilities available to the operator as the contractor for an actual service. Depending on the extent to which the rights owner, i.e. the issuer of the rights objects, wishes to influence the forwarding of derived objects, i.e. in effect issuing rights to individual facilities of the contractor, the forwarding rules are either contained in the originally received rights object or they will be provided separately. Mixed forms are conceivable such that individual forwarding rules or conditions to be observed for complex forwarding rules are included in the originally received rights object and that other conditions will be specified separately, e.g. by the operator/contractor.

A preferred embodiment of the method is characterized by forwarding of derived rights objects on the basis of forwarding rules made available separately, first includes establishing which facility or facilities is or are suitable for executing operations which are allowed with the received rights object or a derived rights object, and then also the formation of a set which includes the facility or each suitable facility, determining a current or future loading of each of the previously determined set of suitable facilities, reducing this set by eliminating each facility for which a loading was determined above a predetermined or predeterminable threshold and finally the forwarding of the or of each derived rights object to the or to each facility which in the final analysis is still a member of the set. The design of the method opens up the opportunity of implementing a flexibility desirable for the operator, i.e. the contractor of the rights owner. It is first established which of the facilities provided by the operator are able to be used at all for the service commissioned. If a number of facilities are basically under consideration, the forwarding can be controlled so that forwarding is undertaken to such facilities or to precisely the facility which in accordance with its loading is best suited for use in conjunction with the task issued by the rights owner. The loading and the threshold value in relation to the loading can in this case relate to a time or quantity-related loading or to a combination thereof.

For the implementation of the method a facility is provided on the service provider side which at least includes receive functionality for receiving rights objects and processing functionality, especially memory and processing facilities, the latter according to the type of processor or similar, for evaluating and processing received rights objects, with which the processing functionality after receipt of a first rights object including a first rights object encompassing at least one variable and receipt of a second rights object belonging to the first rights object, undertakes a combination of the information encompassed by the two rights objects and generates at least one derived rights object therefrom. The facility thus carries out the method as described at the start and below, i.e. combines a second rights object or if necessary even a number of second rights objects with an associated, especially previously received, first rights object and possibly with the data received independently of it. In this case, for the first rights object and the at least one variable encompassed by it, the value defined for this variable in the or in each second rights object is accepted, so that the combination encompasses a full definition of that which is to be permitted to the service provider in relation to the data in which the intellectual property of the rights owner is embodied. The generation of a derived rights object from this combination makes the forwarding of data and associated rights on the service provider side simpler, so that derived rights objects can also be forwarded in a larger production plant or in an engineering office with a number of computers, which are each in their own right suitable for simulation or similar, to individual devices, facilities of systems and these then process the data according to specifications.

For the facility there is advantageously provision for the means that implement the function of a parser and are intended for evaluation and processing of received rights objects, to encompass the processing functionality as a component. When the functionality of a parser is implemented, this can be used to evaluate a defined syntax, with the syntax allowing a publication of variables or variable allocations, so that the first rights object can encompass a variable not defined in respect of its value and the second rights object can encompass a value allocation for this variable. Naturally the functionality of a parser also allows other rights which are to be granted to the service provider in relation to the data to be defined and encoded in a comparatively easy-to-read and thereby also easy-to-modify form for the rights owner.

The invention finally relates to a computer program for carrying out the method as explained above and below in greater detail, then a data medium with such a computer program and a computer system, especially a facility as outlined above, on which such a computer program is loaded.

An exemplary embodiment of the invention is explained in greater detail below with reference to the drawing. Corresponding objects or elements are provided with the same reference symbols in all figures.

The exemplary embodiment or each exemplary embodiment is not to be seen as restricting the invention. Instead numerous variations and modifications are possible within the framework of the current disclosure, especially such variants, elements and combinations and/or materials which for example by combination or variation of individual features or elements or method steps described in conjunction with the general description and forms of embodiment as well as described in the claims and contained in the drawings are able to be derived by the person skilled in the art in respect of achieving the object and which lead by combinable features to a new object or to new method steps or sequences of method steps.

BRIEF DESCRIPTION OF THE DRAWINGS

The figures show

DETAILED DESCRIPTION OF INVENTION

Figure 1:
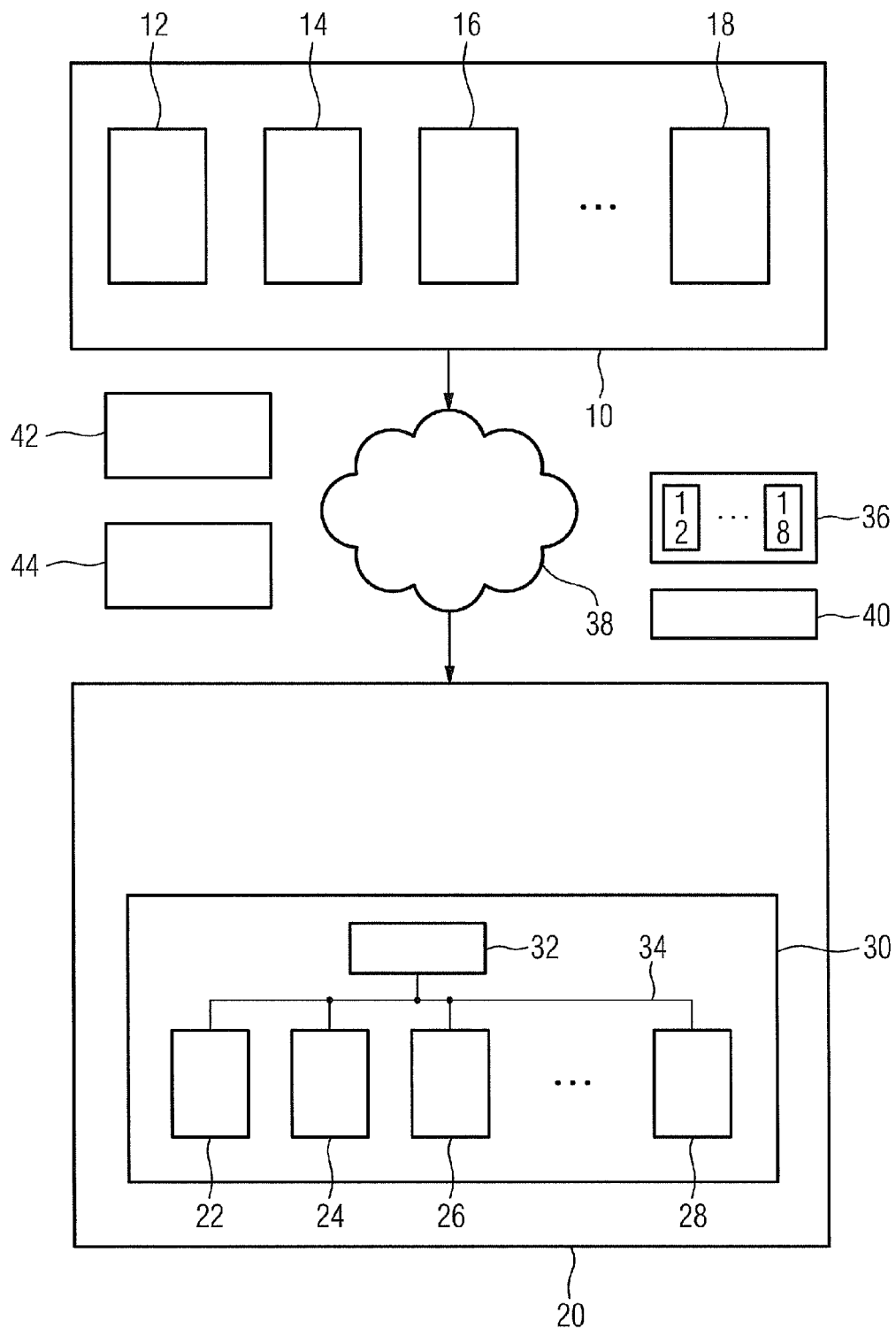
FIG. 1 a scenario addressed by the invention, namely an area of influence of a rights owner with intellectual property of the rights owner and a service provider area of influence with facilities, that are suitable for example for production of goods in accordance with the intellectual property, so that the intellectual property must pass over into the service provider's area of influence for making use of services, FIG. 2 a schematically simplified representation of the inventive approach and FIG. 3 a schematically simplified representation of a facility in which the invention can be implemented, so that the facility functions as a rights agent.

FIG. 1 shows a greatly simplified schematic diagram of a scenario underlying the invention. In accordance with this scenario a rights owner 10, represented by a rights owner area of influence, keeps intellectual property 12, 14, 16, 18 in his area of influence, e.g. data for production of specific goods, such as motor vehicle parts or similar. If the rights owner does not want to manufacture such goods himself, he must make use of a service provider shown by a service provider area of influence, who maintains production means in his area of influence, e.g. facilities 22, 24, 26, 28, with which services can be performed for the rights owner 10. The facilities 22-28 do not necessarily involve devices which produce a physical result, but can equally well be devices with which a simulation result or similar is obtained. The further description will accordingly be continued with the generic term "facility" 22-28 and it should be typically assumed from this that the facility or each facility 22-28 provided by the service provider is a component of a technical installation, i.e. a production plant 30 for example, within which the individual facilities 22-28 are linked to each other if necessary using a higher-ranking unit 32 in the form of a control station, e.g. via a bus 34.

If the service provider 20 is to undertake an activity for the rights owner 10, the latter transfers to the service provider 20 at least data 36 i.e. a product description for example, which describes the service to be provided, for a service which relates to the production of motor vehicle parts for example, i.e. at least data relating to their dimensions and geometry, material, surface and so forth. For exchange of data between rights owner 10 and service provider 20 basically any communication link is suitable that is able to be used between the parties, i.e. including the Internet 38, so that the product description is encrypted to protect the intellectual property 12-18 of the rights owner 10 encompassed by it with methods known per se.

On the service provider side a pair of keys is generated for this purpose; when there is provision for an asymmetric encryption, a private and a public key. The private key remains with the service provider 20; the public key is transferred to the rights owner 10. The rights owner 10 encrypts the data 36—the product description—with a key known only to him. The rights object is encrypted with the public key which it has previously received from the service provider 20 and the key with which the product description is encrypted is contained in the rights object. The service provider 20 then receives the product description and the rights object from the rights owner 10. The service provider 20 decrypts the rights object with his private key from the previous key generation and, with the access that is then possible to the rights object, the service provider 20, although not in person but through his EDP system, e.g. a rights agent, has access to the data in the product description. Actually the key contained in a rights object usually remains hidden to the respective user.

Rights owner 10 and service provider 20 thus exchange before, during or after transfer of the data 36/the product description key data 40 which allows the service provider access to the encrypted data 36 and/or allows him to check the authenticity of the data 36.

The data 36 is protected by a key encompassed by the first rights object 42, initially only known to the rights owner 10, against un-authorized use, which is transmitted together with the data 36 or separately. In addition to the transmission of this first rights object 42, there is a transfer of a second rights object 44 independently thereof, if necessary far later in time than the transmission of the first rights object 42 or several times in succession at comparatively regular intervals. For further explanation of the interaction of data 36, first and second rights objects 42, 44, the reader is referred to the description below which relates to FIG. 2.

Figure 2:
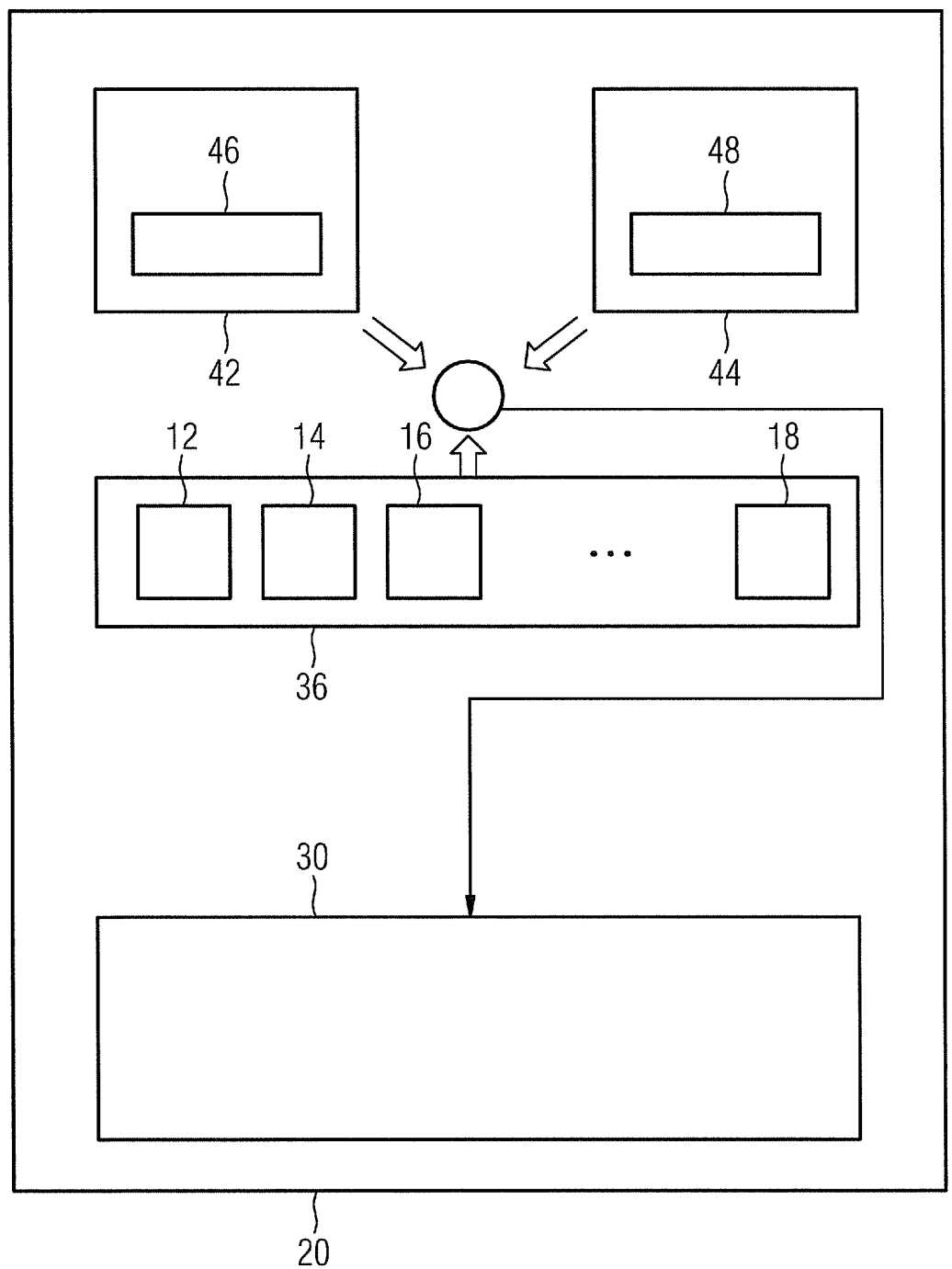

FIG. 2 shows individual details of the diagram from FIG. 1 and is based on the assumption that the data transmitted by the rights owner 10 (FIG. 1) and the first and second rights object also transferred by the latter are present in the area of influence of the service provider 20.

The use of the data of 36 is possible for the service provider 20 only by means of the rights objects 42, 44. To this end the first rights object 42 specifies an authorized usage of the data 36 with at least one variable 46 not defined in respect of its value. As the variable not defined in respect of its value referred to for short below as the "variable" a variable is considered for example which encodes an allowed production quantity. The first rights object 42 can accordingly allow the most far reaching use of the data 36, with for example only a production of objects based on this data 36 not yet being possible since no concrete number of allowed objects is defined. The second rights object 44 transferred independently of the first rights object 42 is provided for this purpose, which defines a value 48 for the at least one variable encompassed by the first rights object.

A combination of the data 36 and the first and second rights object 42, 44, the latter at least encompassing an allocation of the value 48 to the variable 46 defined by the first rights object 42, thus makes the data accessible for an authorized use by the service provider 20. This combination is shown in the diagram in FIG. 2 by the block arrows and, in accordance with the combination, forwarding of the data received from the rights owner in the installation 30 of the service provider to provide the services commissioned by the rights owner 10 is possible.

FIG. 3 shows a simplified schematic diagram of a facility 50 provided by the service provider 20 (FIG. 2) in his area of influence for carrying out the method previously outlined. The facility 50, as means for carrying out the method, comprises at least one receive functionality 52 for receiving rights objects, namely at least one first and second rights object 42, 44. Then the facility 50 encompasses processing functionality 54, at least the latter with memory not shown in the diagram and processing facilities not shown in the diagram in the form of a processor or similar, for evaluating and processing received rights objects. After accepting a first rights object 42 including at least one variable 46 from the receive functionality 52 and also receiving a second rights object 44 belonging to the first rights object 42, the processing functionality 54 generates a derived rights object 56 as a combination of the information encompassed by the first and second rights object 42, 44. With this combination, i.e. with the generation of the derived rights object, the variable included by the first rights object 42 is replaced by the values encompassed by the second rights object 44 for its definition, so that the derived rights object defines the scope of access to the received data 36 permitted to the service provider 20 (FIG. 2).

A functionally downstream rights management functionality 58 gains access with the derived rights object 56 to the received data 36 and at the output of such a functionality the data 36 protected by the rights owner 10 against unauthorized use is available for use by the service provider 20. The facility 50 and the functionalities 52, 54, 58 that it includes can be implemented as a distributed facility, so that for example the receive functionality 52 is encompassed by the control station 32 (FIG. 1) and a combination of processing and rights management functionality 54, 58 by each facility 22-28 (FIG. 1). Similarly there can be provision for receive and processing functionality 52, 54 to be assigned by the control station 32 and a corresponding plurality of rights management functionalities 58 to the respective facilities 22-28. Likewise it is also considered that the facility 50, as shown in FIG. 3, is embodied as a separate communication user on the bus 34 of the installation 30 and undertakes the rights management centrally for the complete installation 30, i.e. the receiving of data 36 and rights objects 42, 44, the combination of first and second rights objects 42, 44 belonging together and the subsequent generation of derived rights objects 56 as well as the forwarding of data becoming available thereby to individual or to a number of facilities 22-28.

At least the processing functionality 54 includes means not shown in the diagram which implement the functionality of a parser. This is executed in operation by the processing facility mentioned and uses the memory assigned to the processing functionality 54. Such means are intended for evaluating and processing received rights. The use of a parser allows a defined syntax to act as a basis for the information encompassed by the rights objects 42, 44, so that, where variable 46 and a value 48 assigning this variable (FIG. 2) are affected, an example for the content of a first and second data object 42, 44 can be specified as shown by the example given below:

. . .
. . .
. . .
Total number of parts
. . .
. . .
    (first rights object 42)
. . .
. . .
. . .
Total number of parts:=100
. . .
. . .
    (second rights object 44)

The invention can thus be summarized as follows: A method and a facility operating in accordance with the method are specified for operating a technical installation 30 using data 36 that is provided by a third party and that is or will be protected against unauthorized use, with rights objects, namely at least a first and a second rights object 42, 44, being used to protect the data 36, with the first rights object 42 specifying an authorized use of the data 36 with at least one variable 46 not defined in respect of its value and with the second rights object 44 defining a value 48 for the at least one variable 46.

The invention claimed is:

1. A method for operating a technical installation using data provided by a third party, the data being protected against unauthorized use, comprising:
  receiving data provided by the third party along with a first rights object and separately receiving a second rights object, the first and second rights objects for protecting the data, wherein the first rights object specifies an authorized use of the data except for at least one variable not defined in respect to its value such that the first rights object comprises an incomplete definition by missing a value for the at least one variable; and wherein the second rights object separately provides the value for the variable not defined in the first rights object in order to provide a full definition and to enable the authorized use; and wherein a relationship between the first rights object and the second rights object comprises a reference to the variable using an identifier for both rights objects;

processing the first rights object and the second rights object by a processor by evaluating the identifier to recognize that the second rights object belongs to the first rights object and then replacing the variable in the first rights object with the value provided by the second rights object such that a combination of the first rights object and the value from the second rights object results in the full definition to enable the authorized use;

generating a derived rights object from the combination that authorizes use of the data and defines a scope of use for the data with the full definition;

providing access to the data by a service provider in accordance with the defined scope; and forwarding the data and the derived rights object by the service provider to one or more facilities according to forwarding rules for processing the data according to specification in the full definition.

2. The method as claimed in claim 1, wherein the variable not defined calls for a period during which the data is usable and the variable separately provided by the second rights object encodes the period during which the data is usable.

3. The method as claimed in claim 1, wherein the variable not defined calls for a number of products which may be manufactured using the data and the variable separately provided by the second rights object encodes the value for the number of products which may be manufactured using the data.

4. The method as claimed in claim 1, wherein the variable not defined calls for a level of detail defining a permitted access to a portion of the data and the variable separately provided by the second rights object encodes the level of detail defining a permitted access to a portion of the data.

5. The method as claimed in claim 1, further comprising: associating the separately provided second rights object with a prior received first rights object using the identifier, wherein the identifier comprises components which encode a hierarchy or a dependency.

6. The method as claimed in claim 1, further comprising: receiving forwarding rules that determine which of a set of facilities the derived rights object and data may be forwarded.

7. A device for executing a method for operating a technical installation using data provided by a third party, the data being protected against unauthorized use, the device comprising:

receiving functionality for receiving data provided by the third party along with a first rights object and separately receiving a second rights object for protecting the data, wherein the first rights object specifies an authorized use of the data except for at least one variable not defined in respect to its value such that the first rights object comprises an incomplete definition by missing a value for the at least one variable; and wherein the second rights object separately provides the value for the variable not defined in the first rights object in order to provide a full definition and to enable the authorized use; and wherein a relationship between the first rights object and the second rights object comprises a reference to the variable using an identifier for both rights objects;

a processor adapted to provide processing functionality for evaluating and processing the received rights objects, wherein the processor evaluates the identifier to recognize that the second rights object belongs to the first rights object;

combines information encompassed by the two rights objects by replacing the variable in the first rights object with the value provided by the second rights object such that a combination of the first rights object and the value from the second rights object results in the full definition to enable the authorized use, generates a derived rights object from the combination that authorizes use of the data and defines a scope of use for the data with the full definition, provides access to the data by a service provider in accordance with the defined scope; and rights management functionality for forwarding the data and the derived rights object by the service provider over a communication link to one or more facilities according to forwarding rules for processing the data according to a specification in the full definition.

8. The device as claimed in claim 7, further comprising: a parser for evaluating and processing received rights included in the processing functionality.

9. The device as claimed in claim 7, wherein the processing functionality comprises a memory and processing devices.

10. The device as claimed in claim 7, wherein the processing functionality further comprises:

associating the separately provided second rights object with a prior received first rights object using the identifier, wherein the identifier comprises components which encode a hierarchy or a dependency.

11. The device as claimed in claim 7, wherein the processing functionality further comprises:

receiving forwarding rules that determine which of a set of facilities the derived rights object and data may be forwarded.

12. A non-transitory computer readable medium storing a computer program for executing a method for operating a technical installation using data provided by a third party and protected against unauthorized use, the method comprising:

receiving data provided by the third party along with a first rights object and separately receiving a second rights object for protecting the data, wherein the first rights object specifies an authorized use of the data except for at least one variable not defined in respect ti its value such that the first rights object comprises an incomplete definition by missing a value for the at least one variable; and wherein the second rights object separately provides the value for the variable not defined in the first rights object in order to provide a full definition and to enable the authorized use; and wherein a relationship between the first rights object and the second rights object comprises a reference to the variable using an identifier for both rights objects;

processing the first rights object and the second rights object by a processor by evaluating the identifier to recognize that the second rights object belongs to the first rights object and then replacing the variable in the first rights object with the value provided by the second rights object such that a combination of the first rights object and the value from the second rights object results in the full definition to enable the authorized use;

generating a derived rights object from the combination that authorizes use of the data and defines a scope of use for the data with the full definition;

providing access to the data by a service provider in accordance with the defined scope; and forwarding the data and the derived rights object by the service provider to one or more facilities according to forwarding rules for processing the data according to a specification in the full definition.

13. The non-transitory computer readable medium as claimed in claim 12, wherein the variable not defined calls for a period during which the data is usable and the value for the variable separately provided by the second rights object comprises the period during which the data is usable.

14. The non-transitory computer readable medium as claimed in claim 12, wherein the variable not defined calls for a number of products which may be manufactured using the data and the value for the variable separately provided by the second rights object comprises the number of products which may be manufactured using the data.

15. The non-transitory computer readable medium as claimed in claim 12, wherein the variable not defined calls for a level of detail defining a permitted access to a portion that data and the value for the variable separately provided by the second rights object comprises the level of detail defining a permitted access to a portion the data.

16. The non-transitory computer readable medium as claimed in claim 12, wherein the method executed by the computer program stored thereon further comprises:

associating the separately provided second rights object with a prior received first rights object using the identifier, wherein the identifier comprises components which encode a hierarchy or a dependency.

17. The non-transitory computer readable medium as claimed in claim 12, wherein the method executed by the computer program stored thereon further comprises:

receiving forwarding rules that determine which of a set of facilities the derived rights object and data may be forwarded.

\* \* \* \* \*